United States Patent
Wie et al.

[11] Patent Number: 6,039,290
[45] Date of Patent: Mar. 21, 2000

[54] ROBUST SINGULARITY AVOIDANCE IN SATELLITE ATTITUDE CONTROL

[75] Inventors: Bong Wie, Phoenix; David A. Bailey, Glendale; Christopher J. Heiberg, Peoria, all of Ariz.

[73] Assignee: Honeywell Inc., Minneapolis, Minn.

[21] Appl. No.: 09/039,959

[22] Filed: Mar. 16, 1998

[51] Int. Cl.[7] .................................................. B64G 1/28
[52] U.S. Cl. ........................... 244/165; 244/164; 244/171
[58] Field of Search ..................... 244/165, 171, 244/164

[56] References Cited

U.S. PATENT DOCUMENTS

| | | | |
|---|---|---|---|
| 3,741,500 | 6/1973 | Liden | 244/165 |
| 4,747,458 | 5/1988 | Andre et al. | 180/79 |
| 4,860,215 | 8/1989 | Seraji | 364/513 |
| 4,967,126 | 10/1990 | Gretz et al. | 318/568.19 |
| 5,276,390 | 1/1994 | Fisher et al. | 318/568.1 |
| 5,441,222 | 8/1995 | Rosen | 244/165 |
| 5,628,267 | 5/1997 | Hoshio et al. | 244/165 |
| 5,681,012 | 10/1997 | Rosmann et al. | 244/165 |
| 5,692,707 | 12/1997 | Smay | 244/165 |
| 5,765,780 | 6/1998 | Barskey et al. | 244/165 |
| 5,777,580 | 7/1998 | Janky et al. | 342/457 |
| 5,794,892 | 8/1998 | Salvatore | 244/165 |

*Primary Examiner*—Peter M. Poon
*Assistant Examiner*—Tian Dinh
*Attorney, Agent, or Firm*—Robert E. Greenstien

[57] ABSTRACT

Control moment gyros in an array are rotated to reorient a satellite. A pseudo inverse control is employed that adds a term to a Moore-Penrose pseudo inverse to prevent a singularity.

6 Claims, 3 Drawing Sheets

ROBUST SINGULARITY AVOIDANCE IN SATELLITE ATTITUDE CONTROL

CROSS REFERENCE TO RELATED APPLICATIONS

This application discloses material discussed in the previously filed application titled Orienting A Satellite With Controlled Momentum Gyros, by David A. Bailey, filed on Sep. 2, 1997, Ser. No. 08,923,742 and these simultaneously filed applications: A Continuous Attitude Control Which Avoids CMG Array Singularities, by David A. Bailey, Christopher J. Heiberg and Bong Wie, SN [Docket No. A66 17025}; CMG Control Based On Angular Momentum to Control Satellite Attitude, by David A. Bailey SN [Docket No. A66 17214]; Escaping Singularities In A Satellite Attitude Control, by Christopher J. Heiberg and David A. Bailey, SN [Docket No. A66 17216].

TECHNICAL FIELD OF THE INVENTION

This invention relates to satellites and robotic systems, for example controlling the orientation of a satellite using a plurality of control moment gyros (CMG).

BACKGROUND OF THE INVENTION

The attitude of an agile spacecraft or satellite is often maintained and adjusted with a control moment gyro array because those devices provide high torque and torque amplification. A typical CMG is a rotating mass suspended on a gimbal with an actuator to rotate it on the gimbal axis, producing torque and accumulating angular momentum. Angular momentum is the integral of torque over time. An array of n>3 CMGs is often used, allowing attitude control with some redundancy. Each CMG has an angular momentum (h) constrained essentially to a plane, the angular momentum vector of the gyro is nearly orthogonal to the gimbal axis. The error in orthogonality is small enough that it does not affect the operation of the CMG, the array of CMGs, or the attitude control of the satellite. The wheel speed of the CMG is essentially constant in most applications, but does not have to be for this invention to work. The torque produced by the CMG, Q is the result of the cross product $Q=\dot{\delta} \times h$, where $\dot{\delta}$ is the gimbal rate and h is the angular momentum of the rotor, if varying wheel speed is incorporated then there is an additional term $Q=\dot{\delta} \times h + \dot{h}$, where the angular momentum h is defined as $h=J\Omega$, and $\dot{h}=J\dot{\Omega}$, where J is the moment of inertia of the rotating wheel and $\Omega$ is the rotational rate of the wheel.

Classically the attitude control calculates the desired attitude acceleration for the satellite $\dot{\omega}_c$, being the three axis attitude accelerations. The gimbal angle ($\delta$) rates for the CMG array are calculated using the pseudo inverse control law, $\dot{\delta}=A^T(AA^T)^{-1}J_s\dot{\omega}_c$, where $J_s$ is the satellite moment of inertia matrix, and A is the Jacobean of CMG array angular momentum with respect to gimbal angle, $$A = \frac{\partial h}{\partial \delta},$$

where h is the sum of the angular momentum of the CMG array, $$h = \sum_{i=1}^{n} h_i.$$

Since the A matrix is a function of the gimbal angles and the gimbal angels change in order to produce torque on the spacecraft the rank of A can drop from 3 to 2, which is a singular condition and the pseudo inverse cannot be calculated. The following publications discussed the pseudo inverse:

1. Bedrossian, N. S., Paradiso, J., & Bergmann, E. V., Steering Law Design for Redundant Single-Gimbal Control Moment Gyroscopes, Journal of Guidance, Control and Dynamics, Vol. 13, No. 6, 1990.
2. Valdali, S.r., & Krishman, S., Suboptimal Command Generation for Control Moment gyroscopes and Feedback Control for Space Craft, Journal of Guidance, Control and Dynamics, Vol. 18, No. 6, 1995.
3. Valdali, S. R., Oh, H.-S., & Walker, S. R., Preferred Gimbal angles for Single Gimbal Control Moment Gyros, Journal of Guidance, Control and Dynamics, Vol. 13, No. 6, 1990.
4. Cornick, D. E., Singularity Avoidance Control Laws for Single Gimbal Control Moment Gyros, Proceedings of AIAA Guidance and Control Conference, 1979.
5. Bedrossian, N. S., Paradiso, J., & Bergmann, E. V., Redundant Single-Gimbal Control Moment Gyroscopes, Journal of Guidance, Control and Dynamics, Vol. 13, No. 6, 1990.
6. Heiberg, C. J., Bailey, D., Wie, B., Precision Control Moment Gyroscope Spacecraft Control with Disturbance, presented at the 1997 SPIE Smart Structures Conference, paper No. 3041–93.
7. Nakamura, Y., Inverse Kinematic Solutions With Singularity Robustness for Robot Manipulator Control, Journal of Dynamic Systems, Measurement, and Control, 1986, vol. 108, pp. 163–171.

DISCLOSURE OF THE INVENTION

An object of the present invention is to significantly increase the speed in reorienting a satellite between two objects by utilizing more of the available angular momentum from the CMGs.

According to the invention the gimbal angle rates are calculated using a new pseudo inverse. The new pseudo inverse prevents the control from becoming unstable when the matrix generated by the Jacobean of the angular momentum with respect to the gimbal angles rank drops to two. Also if a singularity, the rank of the Jacobean drop from three to two, is encountered the solution trajectory passes through the singularity instead of getting caught in the singularity.

Other objects, benefits and features of the invention will be apparent from the following discussion of one or more embodiments.

BEST MODE FOR CARRYING OUT THE INVENTION

Figure 1:
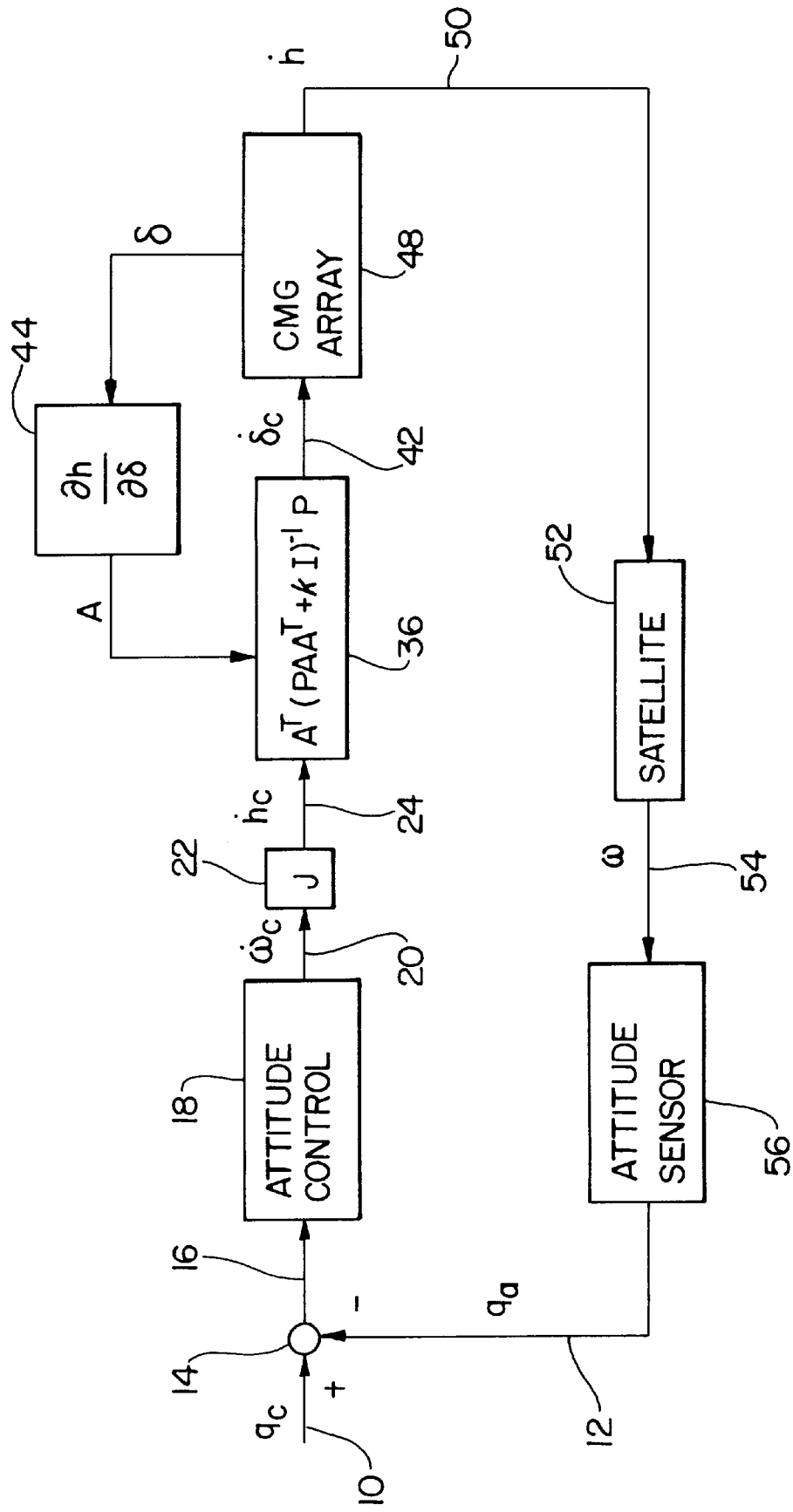
FIG. 1. is a functional block diagram showing a control embodying the present invention to rotate a satellite in response to commanded rotation signal $q_c$.
Figure 2:
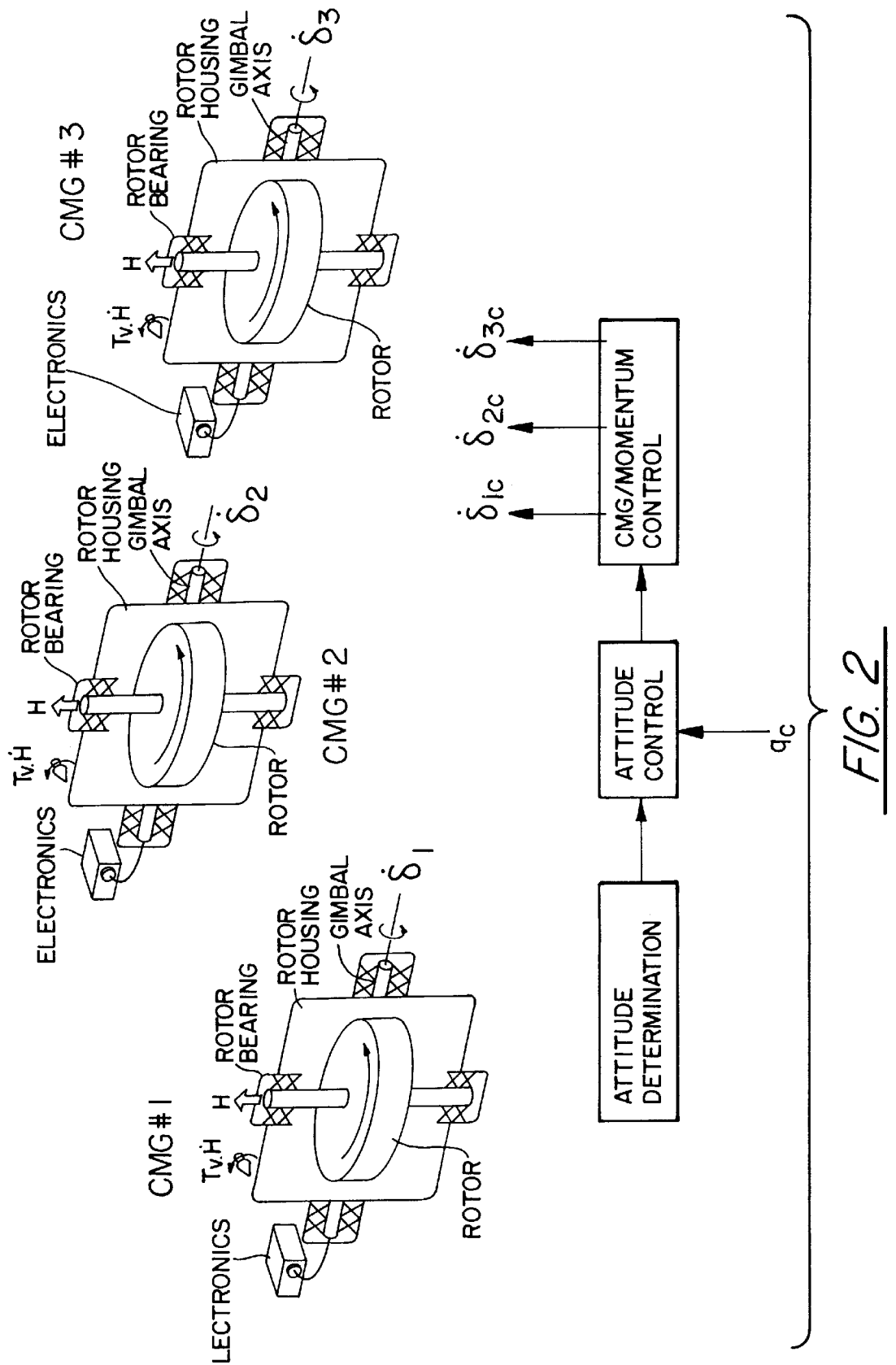
FIG. 2 is a block diagram showing a satellite with CMGs that are rotated to change the satellite's attitude in response to individually produce angular rate signals.
Figure 3:
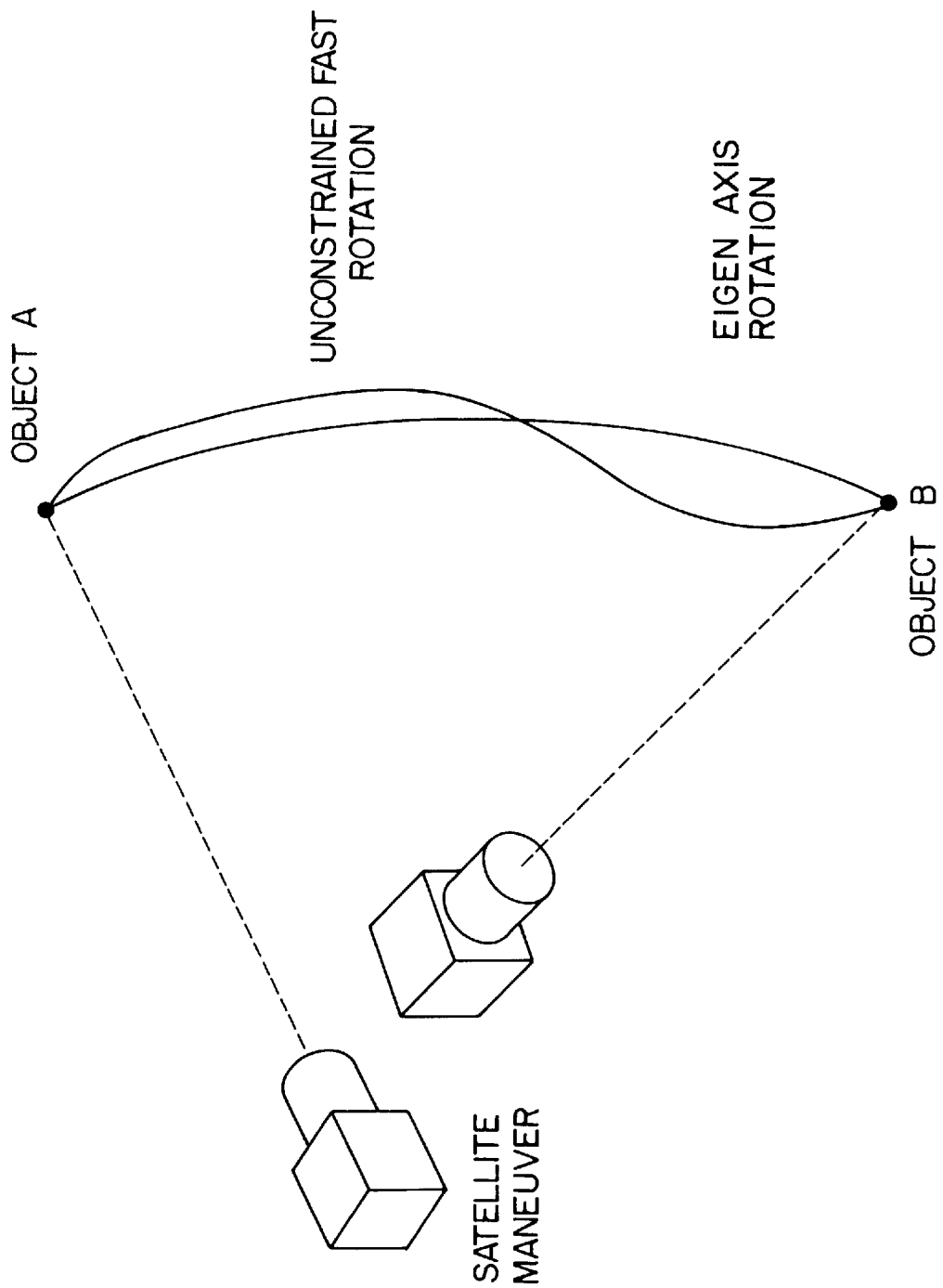
FIG. 3 illustrates two possible paths for reorienting between two objects.

It will be appreciated that FIG. 1 shows function blocks that may be implemented through hardware or software, preferably the latter in a computer based satellite control containing one or more signal processors programmed to produce output signals to control CMGs on the satellite as explained hereafter. Fundamentally the process is shown for a single signal path between two points, but it should be understood that single lines represent vector data which is 3 dimensional for the satellite attitude, attitude rate and torque, and n dimensional for the signals related to the n CMGs. FIG. 2 shows three (n=3) CMGs. The control scheme shown in FIG. 1 is used to pan or rotate the satellite on its axis from the line of sight view of an object A to a line of sight view of object B FIG. 3. A typical closed loop control follows an eigen axis rotation path "old" by controlling the CMGs based on the actual (determined from the attitude determination system ADS in FIG. 3) and desired path attitude. The invention, however, is not constrained to follow an eigen axis path as will be explained.

The desired satellite attitude at input 10, presented as Euler angles, quaternions, Gibbs parameters, or some other convenient way of describing the attitude of a satellite, compared at 14 with actual attitude at input 12 generated by the Inertial Measurement Unit (IMU) 56 or some other method for determining satellite attitude. The attitude error 16 is used by the attitude control 18 to generate a desired body acceleration, $\dot{\omega}_C$ at output 20. The torque command, $\dot{h}_c$ at output 24 is calculated at 22 from the space craft inertial matrix, $J_S$, $\dot{h}_c = J_s \dot{\omega}_c$. The modified pseudo inverse 36 is used to calculate the close loop gimbal rates, $\dot{\delta}_c$ 42, according to the following: $\dot{\delta}_c = A^T(P A A^T + k I)^{-1} P \dot{h}_c$ 36, The added term kI is to keep the equation from becoming indeterminate as the solution trajectory passes through internal singularities, that would be inescapable if this control was not used. The weighting matrix P is used to escape any singularity that is encountered. In order to do this P needs to be of the form $$P = k_1 \begin{bmatrix} 1 & \varepsilon_1(t) & \varepsilon_2(t) \\ \varepsilon_1(t) & 1 & \varepsilon_3(t) \\ \varepsilon_2(t) & \varepsilon_3(t) & 1 \end{bmatrix}$$

where $k_1$ was equal to 1 in the proof of concept, and $$\varepsilon_i = 0.01 \cdot \sin\left(\frac{\pi}{2}t + \frac{2(i-1)}{3}\pi\right)$$

The time varying off diagonal terms in P provide the escape of a control trajectory even when it is started a Moore-Penrose elliptical singularity. The CMG array 48 responds to the gimbal rate command 42. The new gimbal angles 46 are used to generate the Jacobean $$A = \frac{\partial h}{\partial \delta} 44$$

used in the pseudo inverse. The CMG array 48 movement produces torque $\dot{h}$ 50 on the satellite 52. The satellite motion $\omega$54 is detected by the attitude sensors 56.

The invention has been explained in the context of a satellite control, but it can be used in systems, such as robotic systems, which can encounter singularities. With the benefit of the previous discussion of the invention, one of ordinary skill in the art may be able to modify the invention and the components and functions that have been described in whole or in part without departing from the true scope and spirit of the invention.

We claim:

1. A satellite attitude control comprising a plurality of control moment gyros in an array and a controller for changing a gimbal angle on each gyro, characterized in that the controller comprises signal processing means comprising:

means for receiving a desired satellite attitude signal;

means for producing an actual satellite attitude signal;

means for producing an attitude error signal from desired satellite attitude signal and the actual satellite attitude signal;

means for producing a torque command signal in response to the attitude error signal;

means for producing an angular rate signal for each gyro using a pseudo inverse control law that uses said torque command signal and a Jacobean value for the angle of the a gyro, said pseudo inverse including a term that prevents a singularity in the angular rate signal; and means for rotating a gyro in the array in response to the angular rate signal.

2. The satellite control described in claim 1, further characterized in that:

the term prevents the pseudo inverse from being indeterminant.

3. The satellite control described in claim 1, further characterized in that:

said pseudo inverse is $A^T(PAA^T + kI)^{-1}P$, where A is the Jacobean value of the CMG array.

4. A robotic system characterized by a plurality of actuators controlled by a signal processor according to a control law to control an element, characterized in that the signal process comprises:

means for producing an error signal representing the difference between a desired and actual position for the element;

means for producing a rate signal manifesting a desired rate of change in the position of the actuators in response to said error signal;

means for producing a signal that controls the rate of actuator movement by each actuator using a pseudo inverse control law that uses said torque command signal and a Jacobean value for the angle of the actuator, said pseudo inverse including a term that prevents a singularity in the angular rate signal.

5. The system described in claim 1, further characterized in that:

the term prevents the pseudo inverse from being indeterminant.

6. The system described in claim 1, further characterized in that:

said pseudo inverse is $A^T(PAA^T + kI)^{-1}P$, where A is the Jacobean value.

* * * * *